July 26, 1949.  F. A. DOIRON  2,476,962
SCALLOP SHUCKING MACHINE
Filed Feb. 26, 1944  2 Sheets-Sheet 1
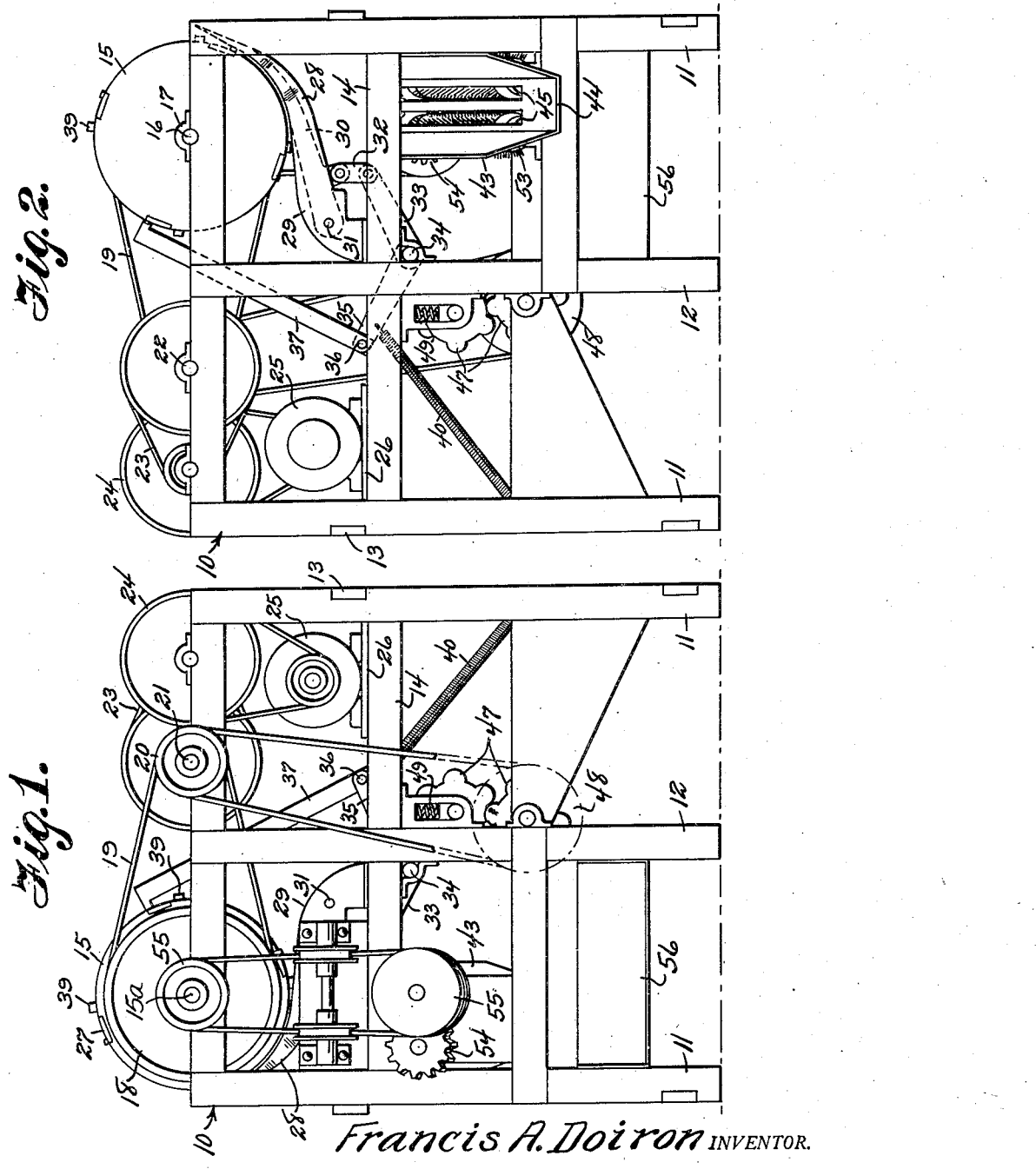
Francis A. Doiron INVENTOR.
BY
Victor J. Evans & Co.
ATTORNEYS

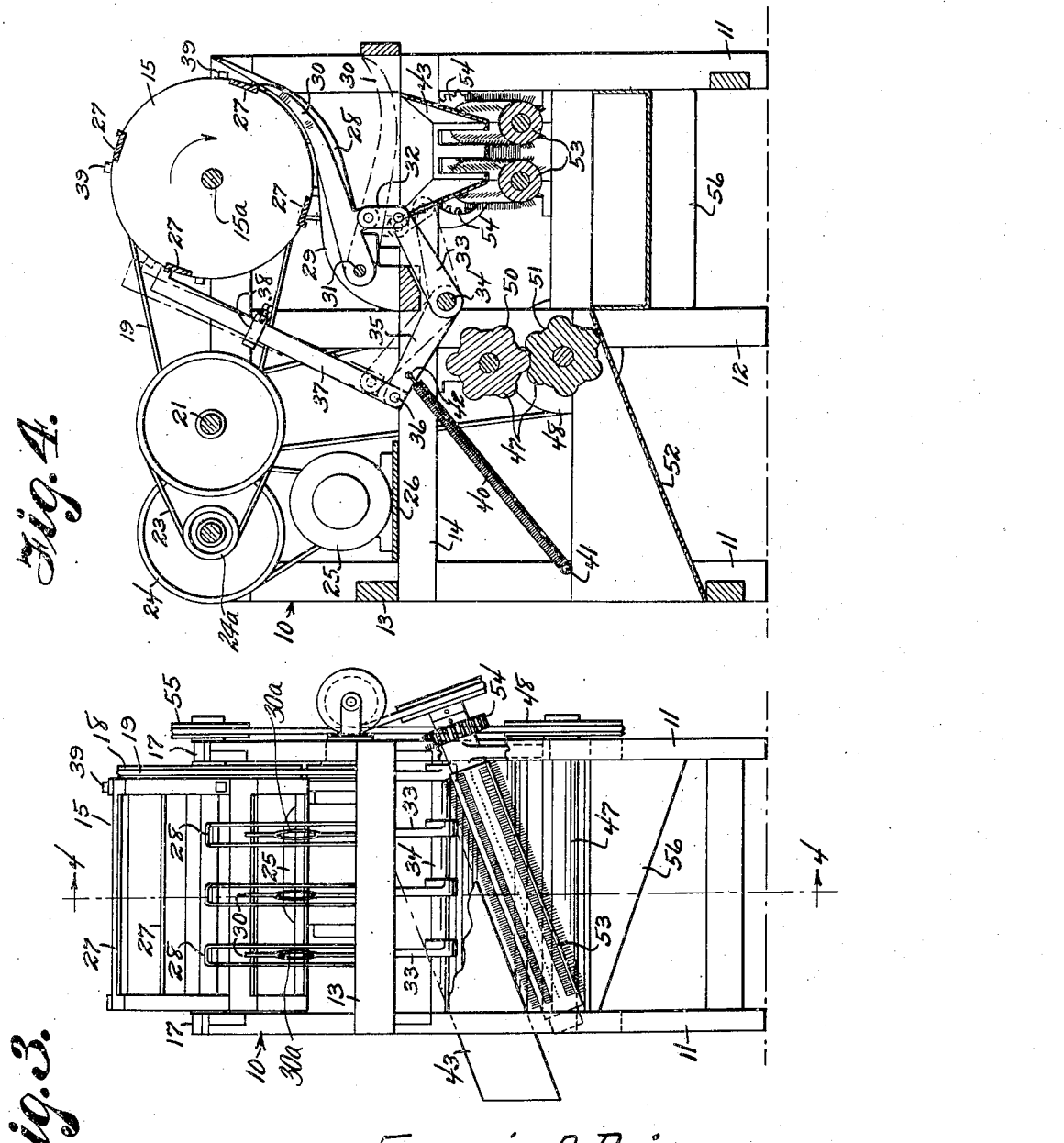

Patented July 26, 1949

2,476,962

UNITED STATES PATENT OFFICE 2,476,962

SCALLOP SHUCKING MACHINE

Francis A. Doiron, Roxbury, Mass.

Application February 26, 1944, Serial No. 524,077

6 Claims. (Cl. 17—9)

1

The invention relates to a shucking machine and more particularly to the class of scallop shucking machines.

The primary object of the invention is the provision of a machine of this character, wherein scallops after being caught can be shelled and cleaned, the soft meat thereof being recovered, which is to a large extent lost when hand shelling is resorted to, and the machine is automatic in the operation thereof, and hand shucking is entirely eliminated.

Another object of the invention is the provision of a machine of this character, wherein the meat and the shell of scallops are sorted, this being effected automatically, and the working parts of the machine are visible at all times, and such machine is adaptable for service on a fishing vessel and can be stowed away when not in use thereon.

A further object of the invention is the provision of a machine of this character, which is simple in construction, thoroughly reliable and efficient in operation, strong, durable, easy of operation, requiring little or no repairing, and inexpensive to manufacture and install.

With these and other objects in view the invention consists in the features of construction, combination and arrangement of parts as will be hereinafter more fully described, illustrated in the accompanying drawings, which discloses the preferred embodiment of the invention, and pointed out in the claims hereunto appended.

In the accompanying drawings:

Figure 1 is an elevation of the machine constructed in accordance with the invention.

Figure 2 is a similar view looking toward the opposite side thereof.

Figure 3 is an end elevation.

Figure 4 is a sectional view on the line 4—4 of Figure 3, looking in the direction of the arrows.

Similar reference characters indicate corresponding parts throughout the several views in the drawings.

Referring to the drawings in detail the machine comprises a main frame 10 having the outside and intermediate vertical legs 11 and 12, respectively, joined with longitudinal and transverse rails 13 and 14, respectively, to effect a rigid unitary frame structure.

A drum 15 having a shaft 15a and formed with longitudinal slats 27 about the periphery of the drum, is journaled in the frame 10, the journals 16 of the drum shaft having bearings 17. A pulley 18 carrying a belt 19 is driven by a pulley 20 on the countership 21 journaled at 22 on the frame 10. The countershaft 21 is driven by a belt 23 on a pulley 24a driven from the motor 25 which is mounted upon a platform 26 in the frame 10.

Below the drum 15 are located the knife sheaths 28 mounted upon a support 29 in the frame 10 and the sheaths are fixedly supported with relation to the drum 15.

Within the sheaths are the vertically swinging knives 30 pivoted at 31 to move in and out of the sheaths which along a portion of their length lie close to the drum 15. The knives 30 are formed with double sections 30a seen in Figure 3 of the drawings.

The knives are linked at 32 with the cranks 33 of the rock shaft 34 journaled in the frame 10. The shaft is equipped with a trip arm 35 pivotally connected at 36 with a plunger 37 operating in guide 38. The plunger is actuated by trips 39 on one end of the drum 15 to pivot the knives at 31 against the resistance of the spring 40 attached at the points 41 and 42 respectively.

The deep sea scallop, for which the structure of this invention is designed, consists of two shell sections hinged at one side and having an opening near the hinge of from ⅛ to ¼ inch. The deep sea scallop has a single tendon securing the sections together and the soft meat lies close to the tendon within the shell.

In using the above described portion of the machine a scallop is placed by the operator on the end of one of the sheaths 28, the sheath entering the scallop through the small opening near the hinge thereof. After the scallop travels downwardly on the sheath, it approaches a knife 30, the point of the knife being positioned between the sides of the sheath is inserted into the small opening adjacent the hinge of the scallop.

The drum, rotating, carries the slats around and one slat will strike the impaled scallop and continuing in contact will push the scallops down along the knife. As the scallop reaches the double knife section, it will be forced into the inner contour of the shell sections and will cut the tendon at both ends and will sever the soft meat of the scallop.

Below the knives 30 and in the frame 10 I have provided a laterally inclined meat receiving trough 43 having in its bottom 44, elongated slots 45 through which passes the soft meat of the scallop after removal from the shells as stated above. The tendons being larger than the slots 45 do not fall through but are discharged from the trough 44.

Immediately below the slotted trough are located brush rollers 53, the tines of which penetrate the soft meat of the scallop and draw the impaled soft meat through to deposit the same in the receiver 56. Gears 54 connect the brush rollers which are driven by pulley and belt connections 55 from the shaft 15a of the drum 15.

The shells being pushed from the sheath by successively fed scallops are discharged through a chute, not shown, to the crushing roller superimposed relative to each other and suiatbly journaled in the frame 10. The rollers 47 are driven by pulley and belt connections 48 from the countershaft 21 and the upper roll 47 is vertically tensioned as at 49, it being an idler roll and driven from the other roll by the interfitting rib and groove formation 50 and 51, respectively.

From the above description it will be apparent that the single manual operation is the impaling of the scallop on the knife 30 after which the slats push the scallop along the knife so that the shell sections are separated and the tendon and soft meat removed. The tendon, soft meat, and shell sections are disposed of as described above.

What is claimed is:

1. A machine of the kind described, comprising a stand, a slatted drum rotatably supported therein, knife sheaths coacting with the slats of the drum, knives working through the sheaths and each adapted to receive and impale a manually fed scallop, a slotted spout beneath the sheaths, brush surfaced rollers rotating toward each other next to the slots in the spout, crushing rolls operating to one side of the spout and below the drum, and means for intermittently moving the knives into and from the sheaths.

2. A machine of the kind described, comprising a stand, a slatted drum rotatably supported therein, knife sheaths coacting with the slats of the drum, knives working through the sheaths and each adapted to receive and impale a manually fed scallop, a slotted spout beneath the sheaths, brush surfaced rollers rotating toward each other next to the slots in the spout, crushing rolls operating to one side of the spout and below the drum, means for intermittently moving the knives into and from the sheaths, and means for simultaneously operating the drum, rolls, rollers and said means.

3. A machine of the kind described, comprising a stand, a slatted drum rotatably supported therein, knife sheaths coacting with the slats of the drum, knives working through the sheaths and each adapted to receive and impale a manually fed scallop, a slotted spout beneath the sheaths, brush surfaced rollers rotating toward each other next to the slots in the spout, crushing rolls operating to one side of the spout and below the drum, means for intermittently moving the knives into and from the sheaths, means for simultaneously operating the drum, rolls, rollers and said means, and receivers below the rolls and rollers, respectively.

4. In a scallop shucking machine, the combination with sheathed knives each adapted to receive and impale a manually fed scallop, a slatted drum located above the knives and sheaths, means for rotating the drum whereby a slat will press the impaled scallop along the knife to open the scallop shell and permit the knife to remove the soft meat and tendon, means for separating the meat from the tendon, and discharge means for the shells.

5. In a deep sea scallop shucking machine, the combination with sheathed knives each adapted to receive and impale a manually fed scallop, a slatted drum located above the knives and sheaths, means for rotating the drum whereby a slat will press the impaled scallop along the knife to open the scallop shell and permit the knife to remove the soft meat and tendon, means including brush rollers for separating the meat from the tendon, and discharge and crushing means for the separated shells.

6. In a scallop shucking machine, the combination with sheathed knives having single points and double blade sections, each of said points being adapted to receive and impale a manually fed scallop, means for pressing the impaled scallop along the knife whereby the double blade section will sever the meat and tendon from the shell, means for separating the meat from the tendon, and means for discharging the empty shell.

FRANCIS A. DOIRON.

REFERENCES CITED

The following references are of record in the file of this patent:

UNITED STATES PATENTS

| Number | Name | Date |
|---|---|---|
| 848,784 | Torsch et al. | Apr. 2, 1907 |
| 1,445,672 | Egli | Feb. 20, 1923 |